Sept. 23, 1952     H. C. A. VAN DUUREN     2,611,824
TELEGRAPH RECEIVING APPARATUS
Filed Jan. 15, 1948     2 SHEETS—SHEET 2
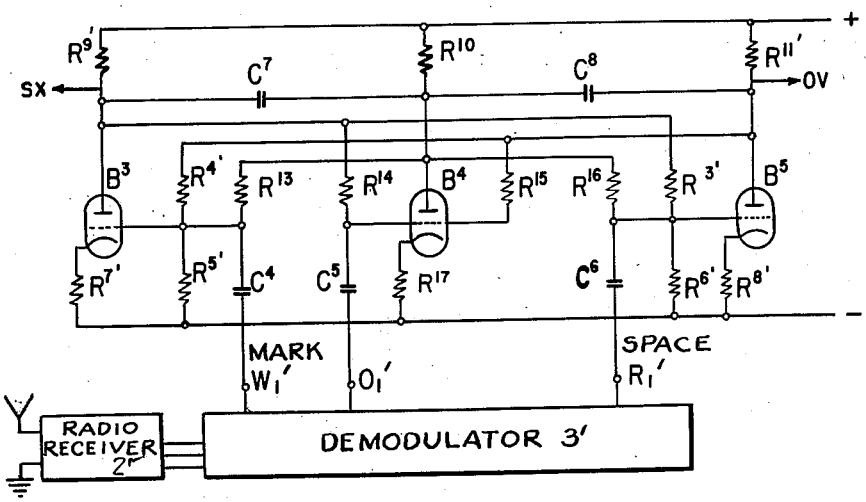
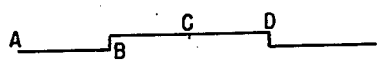
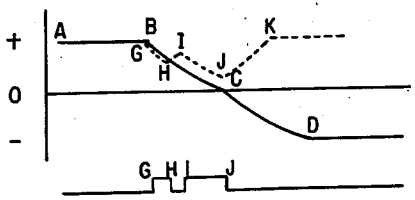
*INVENTOR.*
Hendrik C. A. van Duuren Patented Sept. 23, 1952

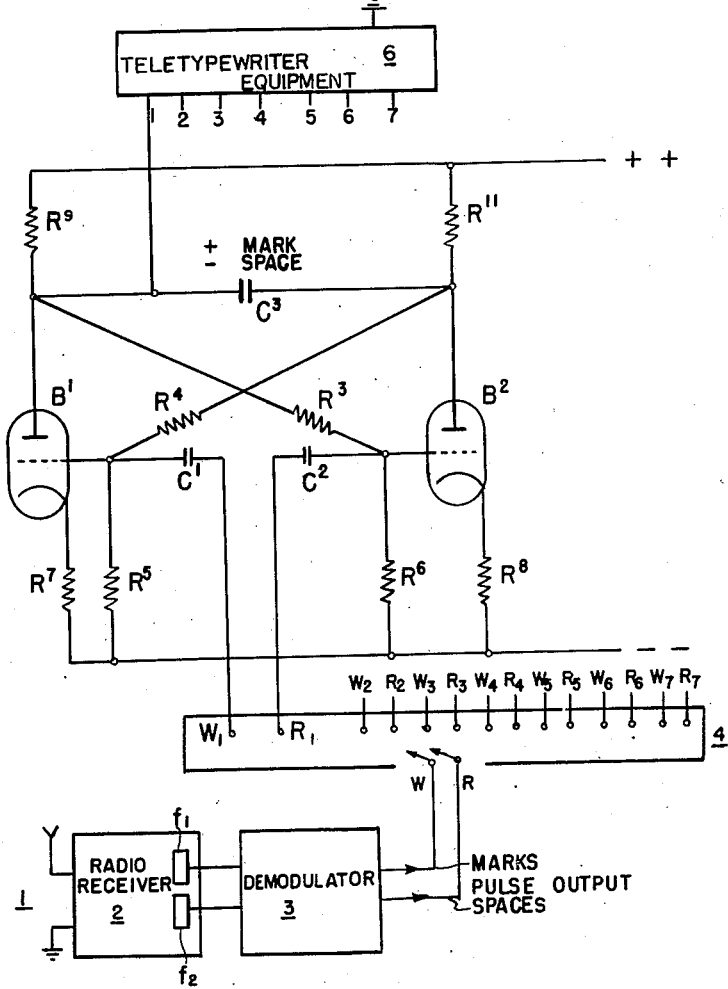

2,611,824

UNITED STATES PATENT OFFICE 2,611,824

TELEGRAPH RECEIVING APPARATUS

Hendrik C. A. van Duuren, Wassenaar, Netherlands, assignor to Staatsbedrijf Der Posterijen, Telegrafie en Telefonie, The Hague, Netherlands Application January 15, 1948, Serial No. 2,437
In the Netherlands October 24, 1946

13 Claims. (Cl. 178—88)

The present invention relates to a telegraph receiving system and apparatus for integrating scanning that gives a greater protection against the response of the scanning arrangement to faults of an intermittent nature than the system described in my prior United States application Serial No. 686,181 filed July 25, 1946, based on Netherlands patent application 117,679.

In conventional type telegraphy systems, the transmission of information between remote geographical points is normally effected through the medium of selectively generated so-called "marking" and "spacing" signal pulses which are grouped in given combinations, as for example, the combinations taught by the Baudot 5 unit code. Each combination of marking and spacing elements is assigned to represent an alphabetical letter or numeral, and transmission of the proper series of combinations thus achieves transmission of intelligible information.

In the transmission of signals in this manner over most known types of systems, however, the signals are frequently subjected to disturbances known as "fading" and "extras" which tend to distort the signal pulse sufficiently to effect the printing of an erroneous signal and a mutilated message. The disturbance termed "fading," as known in the art, generally pertains to power losses which may result during transmission responsive to the existence of unfavorable line or atmospheric conditions, and the general effect thereof is to weaken the marking elements of a transmitted signal to the point where operation of the mark responsive apparatus at the receiving end of the system is prevented.

The term "extras," on the other hand, pertains to the provision of false signal pulses resulting from unfavorable atmospheric conditions which tend to distort a space element in such manner as to effect the erroneous registration of a marking element at the receiving apparatus.

Various types of detecting and compensating units have been heretofore provided which are adapted to automatically detect the presence of these false signals, to terminate transmission thereof, and effect the re-transmission of that portion of the message which has been erroneously received. The conventional compensating and detecting equipment known heretofore in the art, however, has been generally arranged to accept, as a marking element, those false signals which are prevalent for as little as 50% of the length of a space element, and it is apparent that in areas in which unfavorable atmospheric conditions are prevalent, the registration of erroneous marking elements will frequently result.

It is an object of the present invention, therefore, to provide a receiving system which is adapted for reliable operation in areas of this general type, and a specific object to provide apparatus which is operative to register marking elements only in the event of the receipt of intermittent marking current at the receiving equipment for at least 75% of the element time interval.

The invention is in particular applicable to telegraph receiving apparatus for the reception of signals consisting of elements, such as marking elements and spacing elements, which apparatus records these elements successively on several devices, which to that purpose are successively brought into co-operation with a common receiving device on which the received currents arrive. In a receiving apparatus with a distributor, for example, the common device is the input relay and the devices for recording the elements are the receiving relays, wherein each in its turn is connected by the distributor to the armature of the input relay, if it is a mechanical relay. In an apparatus with an electrical input relay, an arrangement is used that has a corresponding operation. When such type of apparatus is used, the code combination signals are subjected to an integrated scanning operation for determining faults or mutilation of the signals. The invention is based on the perception that a minimum sensitivity to faults is obtained by fixing the response time of the receiving relays on half the scanning time, supposing the receiving relay to be of the kind that, it will carry over to the final position after the armature has been carried over the intermediate position, without further energization.

According to a characteristic of the invention a trigger arrangement with two or more electronic valves is used as a receiving relay.

The arrangement is somewhat similar to the apparatus shown in the copending United States application Serial No. 2,438, filed January 15, 1948, which illustrates a series of receiving relays of the electronic type wherein each, in its turn, is connected by a distributor to the armature of an electrical input relay. According to the conventional type arrangements, each of the receiving relays are connected to the electrical input apparatus, once for each signal received, the duration of connection of each relay thereto being approximately equivalent to the time duration of one element of the signal. The response time of the electronic receiving relays in the present arrangement corresponds to that of conventional arrangements, that is, the relay response time is adapted to be one half the wiping or connecting interval.

According to the invention, the receiving relay arrangement has two or more states of equilibrium and it can be triggered with an adjustable transition time from one equilibrium position into the other whenever a trigger impulse is led to the grid of one or more valves. In the trigger arrangements and in the mechanical relays known as yet, the transition time is not adjustable and in practice, it is very small, a pulsating direct current being supplied, the course of which can be represented by a series of rectangles. Just like similar known arrangements, the arrangement according to the present invention contains two or more electronic valves, fed back on one another, the anode of one valve being connected to the grid(s) of the other valve(s). According to the invention, an adjustable transition time is, however, obtained here by inserting one or more condensers between the anodes of two or more valves. The outgoing direct current alternatively increases and decreases in value and these changes are dependent on the applied trigger impulses and the charging and discharging currents of the condenser(s). The impulses that make the arrangement trigger may, for example, be signal elements originating from a radio telegraph receiver.

As explained above, integrating scanning is desired for a faultless reception of radio telegraph signals. In the arrangement according to the invention, this scanning if obtained, if the transition time, during which the relay is somewhere between the equilibrium positions, has the above mentioned right value, which value is dependent on the right choice of the condenser(s) and anode resistances. Preferably the circuit is such that a preceding element will have left an integrating condenser, after an integrated element has been passed on therefrom, in a definite initial condition from which to start the integration of the succeeding element. If this condition is not satisfied, a little more than 25% disturbance can prevent the relay going back from mark to space.

An arrangement suitable for the reception of signals transmitted with a double-wave (e. g. marking elements on the marking wave, the modulation of the spacing wave being zero, and spacing elements by modulation of the spacing wave, the marking wave being simultaneously zero) according to the invention consists of three valves, connected two by two by interanode condensers in the manner described above, the intermediate valve being constantly conductive, the marking wave being led to the left hand one and the spacing wave being led to the right hand one. One form of double-wave receiver is shown more completely in my copending application, Serial No. 2,438, filed January 15, 1948. By way of example some of the arrangements according to the invention will be explained by means of the annexed drawing, Fig. 1 showing an arrangement with two triodes and Fig. 2 an arrangement with 3 triodes.

As shown in Figure 1 the associate equipment may comprise a conventional antenna system 1 which is arranged to receive the signals as transmitted from a distant source and to couple the received signals to the input side of an associate radio receiver 2. It is to be understood, of course, that the incoming signals may be received over carrier or metallic line equipment in a similar manner, the radio receiver equipment having been shown merely for purposes of illustration.

Conventional filter networks associated with the radio receiver equipment are operative to filter the several incoming frequencies and to extend the respective marking and spacing pulses carried thereby over separate output paths to associated demodulator equipment 3. The demodulator equipment may be a simplified version of that shown in the heretofore mentioned copending application, the equipment being operative to apply a negative pulse to conductor W which is commensurate with the marking elements received and a negative pulse to conductor R which is commensurate with the spacing elements received. It is apparent therefrom that any demodulator unit which is the equivalent of a mechanical input relay adapted to move its armature alternatively between two contacts to supply negative potential to one of two output paths in accordance with the nature and duration of the signal received, may be used in the arrangement shown in Figure 1. A modulator unit adapted for use with the receiver circuit shown in Figure 2 may comprise any unit which is the equivalent of a three-position mechanical switch arranged to place positive potential alternatively on conductor W1, O1, or R1 responsive to the receipt of a marking impulse, no impulse, or a spacing impulse respectively.

The demodulator output path comprising conductors W and R in Figure 1 is arranged to be connected at predetermined time intervals to a series of so-called "receiver relays" by a selection switch 4 which operates in synchronism with the incoming signals. There are seven receiving relays when used with seven unit code (five when used with five unit code, etc.), each of which is assigned to record a particular element of a signal and each being connected to the demodulator output path (W and R) as its assigned element is received. A pair of incoming conductors, such as W1 and R1 of the first receiving relay, extend from each receiving relay to the selector switch 4. As the first element of each signal is received, the selector switch 4 connects the receiving relay input leads W1 and R1 of the first receiving relay to demodulator output conductors W and R and a negative pulse is extended over one of the conductors in accordance with the nature of the element received. With receipt of successive elements the selection switch connects the demodulator unit 3 to the successive receiver relays.

Each receiver relay comprises a pair of tubes B1 and B2 which are interconnected with each other and a supply source to effect energization of one of the tubes at all times. The polarization resistances R7 and R8 have been arranged before the cathodes of the valves B1 and B2. The anode of B1 has been coupled via resistance R3 to the grid of B2 and the anode of B2 via resistance R4 to the grid of B1. The plates of tubes B1 and B2 are connected to the positive side of the supply source by resistances R9 and R11 and an interconnecting capacitor C3 is coupled between these plates. Associated teletypewriter equipment 6 is connected to each of the receiver relays and is arranged to be operated in conformity with the charges which are gathered on the seven condensers (C3), of the seven receiver relays. That is, the receiver relays effect the application of a positive charge on condenser C3 with receipt of a marking element and the application of a negative charge with receipt of a spacing element and the teletypewriter units respond to the various charges to provide the correct signal. The manner of operation of the teletypewriter equipment is not considered pertinent to the present disclosure.

The anode resistances R9 and R11 effectuate the necessary delay during the charging and discharging of condenser C3 to effect the necessary transition time in the operation of the equipment responsive to receipt of the marking and spacing impulses.

The input path W1 is connected to the grid of valve B1 in circuit relation with condenser C1 and resistances R5, R4 and R11 which are connected between the positive and negative conductors of the supply source. The input path R1 is connected to the grid of valve B2 in circuit relation with condenser C2 and resistances R9, R3 and R6 which are connected between the positive and negative conductors of the power supply source. Supposing the condensers C1 and C2 to be uncharged and valve B2 to be conductive (one of the valves being conductive at all times as will become apparent hereinafter), current will flow through the anode circuit of this valve. The choice of the resistances R11, R4 and R5 in connection with the internal resistance of B2 is such that the grid of B1 has such a large negative voltage that this valve is non-conductive.

Assuming now the receipt of the first element of a seven code signal, the selector switch 4 is effective to connect demodulator leads W and R to the input leads W1 and R1 of the first receiver relay. Assuming further that the first element of the sequence is a spacing element, a negative pulse is transmitted over conductor R1 to render the valve B2 non-conductive, whereupon valve B1 will be rendered conductive and the condenser C3 will assume a negative charge to indicate a space element and to operate the teletypewriter equipment in accordance therewith.

Such operation is effected as follows: as the first element (assumed to be a spacing element in the given example) is received, the selection switch 4 connects conductors W and R to W1 and R1. In that the first impulse is a space element a negative impulse is applied to conductor R1 by the demodulator unit 3, the negative pulse output of the demodulator being for a time duration which is equivalent to the pulse received by the radio receiver 2. The negative pulse is then applied over conductor R1 via C2, whereby the grid of B2 receives a higher negative potential; then this valve is no longer conductive and the voltage at the anode increases. A current that is decreasing in value, proceeds, however, to flow through resistance R11, until the right-hand plate of condenser C3 is wholly positively charged. In proportion as this charging current is decreasing, more current flow to the grid of B1, on which grid the voltage is constantly becoming less negative, until, at the moment when no more charging current is flowing through R11 to C3, B1 becomes conductive.

Referring now to the operation of valve B1, the current in the anode circuit of valve B1 increases gradually and almost with linearity and reaches its maximum, as soon as capacitor C3 is charged in the reverse direction. On the arrival of a negative impulse via C1 on the grid of B1, responsive to receipt of a marking impulse by the radio receiver equipment 2, B1 is brought to cut-off in a wholly corresponding manner and B2 becomes conductive to effect the application of a positive charge to the left hand plate of condenser C3, and accordingly an indication to the teletypewriter equipment that the first element of the incoming seven code signal is a mark element.

In an arrangement such as is shown in Figure 1, if all the recording relays were put in the spacing position before the wiping of a new signal is initiated, there is some possibility that fading of a signal will cause the circuit to indicate a spacing signal, even though no definite spacing voltage was received. To preclude such erroneous manifestation, it may be preferable to use a third indicating tube to indicate the particular instances in which no signal is received.

Figure 2 shows such an arrangement with three inputs, i. e. W1 for the marking-wave, R1 for the spacing wave and O1 for the application of the positive impulse that is necessary for making the middle tube B4 conductive (see my aforesaid application, Serial No. 2,438, filed January 15, 1948). As pointed out heretofore a demodulator unit for use in the arrangement of Figure 2 may comprise any switching unit, such as illustrated demodulator unit 3′, which is operative to supply a positive impulse to conductor W1′ with the receipt of a marking element, a positive impulse to conductor O1′ in the absence of a signal, and a positive impulse to conductor R1′ with the receipt of a spacing element. Because B4 is normally conductive, the voltage at the grids of B3 and B5 becomes negative, so that these valves as yet remain non-conductive. Resistance R5′ connected in the grid input circuit for valve B3 is of a smaller value than the total value of combined resistances R4′ and R11′ and tube B3 is normally biased to cut off thereby. Thus with the receipt of a marking element and the application of a positive pulse over W1′ to the grid input circuit constituted by these resistances and the condenser C4′, the grid of valve B3 is made more positive and the valve B3 becomes conductive.

The voltage of the anode of valve B3 decreases as well as the voltage at the grids of B4 and B5 owing to which tube B4 is brought to cutoff and B5 remains non-conductive, even if the grid of the last mentioned valve would receive a positive impulse via condenser C6. B5 can only become conductive, if beforehand B3 has become non-conductive and B4 has become again conductive. With B4 rendered conductive again with application of a positive pulse over O1′, the succeeding positive pulse arriving over W1′ or R1′ will effect, in the manner described, the conductivity of valve B3 or B5. The capacitors C7 and C8 are charged and discharged in accordance with the existing condition of the receiver relay. The condition of the receiver relay as indicated by the condition of these capacitors is transmitted over the output terminals SX and OV which are in turn connected to associated operating equipment. The function of the arrangement is quite similar to the function of a polarized relay, so far as moving over from marking to spacing and the reverse is concerned. It is only necessary to bring the armature past the equilibrium position, or to bring it with a finite speed into the equilibrium position, after which it continues over until the opposite contact is reached. The transition time of the receiving relay herein disclosed is adjustable with condenser C3, or condensers C7 and C8. The receiving relay of the present invention can only be moved over or triggered by an intermittent disturbance, if the integrated voltage in the direction necessary for the moving over or triggering, rises above a value that, dependent on the curve, amounts to 75% of the signal length.

Specifically, as has been previously pointed out, the response time of each receiving relay in conventional embodiments is approximately one half the time duration of the transmitted element, such value having been slavishly adopted in the art over a long period of time. That is, the elements as generated each have a definite time duration, and the receiving relays are arranged to have an operating period or response, the time duration of which is equivalent to one half the assigned time duration of the element. Thus, if over one half of an element "fades" in transmission, the receiving equipment will be unable to respond.

With reference to Figure 3 the operation of the receiving relay will become more apparent therefrom. As previously pointed out, one of the tubes B1 or B2 is alternatively conductive at all times and capacitor C3 is charged to a positive or a negative polarity in accordance with the operative condition of the tubes. Assuming that tube B1 is non-conductive and B2 is conductive, a positive charge will exist on capacitor C3, such charge being indicated by AB in Figure 3B.

Assuming now the receipt of a space element BD by the first receiver relay, an operating impulse is applied over R1 and a negative impulse appears on the grid of tube B2. As tube B2 is responsively biased to cutoff, the discharge of condenser C3 is initiated and continues toward zero as shown at BC (Figure 3B). If the tube B3 is cutoff for a time period equivalent to one half of the assigned time duration of the element (as generated) the point C will be reached, whereupon valve B1 will be rendered conductive and the arrangement automatically continues to complete charging of condenser C3 in a negative direction (CD) and to render valve B2 non-conductive. This further operation, after point C is reached responsive to receipt of 50% of the element, is automatically effected independent of the further persistence or non-existence of the incoming impulse. The negative charge, which is now on the condenser is indicative of the space element and the receiving relay supplies such indication to the teletypewriter equipment 6.

With the receipt of a marking impulse thereafter the condenser C3 will discharge to zero and recharge to the opposite polarity (positive) in a similar manner.

In the event, however, that a series of atmospheric or power line disturbances (known as transients in the art) should simulate a marking or spacing element, the receiver relay of the disclosure is arranged to provide an added margin of safety to prevent false operation of the equipment.

Specifically, while the relay will respond to a false element which persists for a period of time equivalent to one half of the assigned element time period (as generated), it will not respond to a series of intermittent pulses which occur in the period assigned for an element whenever the summated value of the intermittent pulses is less than 75% of the assigned time period. Since most transients are brief intermittent pulses, such condition occurs infrequently and a tremendous advance in the elimination of false circuit operation is effected.

The manner in which such safety margin is effected may be best explained by reference to Figures 1 and 3. Assuming for example, that valve B2 is conductive and a positive charge exists on condenser C3 and that a pair of short transients GH and IJ are received. As transient GH is received, the tube B2 will be rendered non-conductive for the period of endurance of transient GH and condenser C3 discharges to approach the kickover point at C. However, with termination of the transient at point H, tube B2 is once more rendered conductive and condenser C3 starts to recharge toward level AB. As transient IJ now appears the condenser C3 has partially recharged to point I and the discharge must start from that level. Accordingly, it is seen that with receipt of intermittent pulses a portion of the pulse received is cancelled by the time period following that pulse, the amount of cancellation being dependent upon the length of the following open or space period.

It is seen, for example, that if the open interval HI between the transients were of the same duration as the pulse GH the condenser would be fully recharged by the time the second transient IJ was received and the second transient would have to start from level AB.

As the transient IJ is terminated the discharge of capacitor C3 is terminated and the capacitor recharges to the original level AB and the receiving relay does not flip to register an incorrect signal.

Thus, with the time duration of the intervals between the transients cancelling a corresponding portion of the preceding transient, and since it requires an effective pulse value equivalent to a 50% duration to the assigned pulse to reach point C (after which automatic tripping occurs), with time interruptions between impulses of more than 25% of the assigned pulse time, the point C cannot be reached.

Specifically, whenever 25% interruptions occur, 25% of the effective pulsing energy is cancelled, and the remaining 50% of the pulse is just enough to bring the equipment to point C. If more than 25% interruptions occur, that additional portion must cancel a part of the required 50% pulse energy and operation of the equipment cannot occur. It is seen, therefore, that the equipment will only register a space or mark element if the summated duration of the pulse is for 75% (50% plus 25%) or more of the element time, and accordingly false operation by intermittent transient impulse is rendered somewhat difficult.

It is apparent that the insensitivity to extras might be increased by increasing the response time of the receiving relays to a larger value than 50%. Such arrangement however would also be accompanied by an undesirable increase in sensitivity to fading and, of course, less reliable operation of the equipment would result. Through the use of the present arrangement faulty response to transient conditions by the equipment is minimized without effecting the response of the equipment to fading conditions. This maximum is reached for very fine continuous division of the voltages (noise character), 100−75=25% (for the moving over) unfavorable current not being deducted from the 75% favorable current, so that at the end of the signal element the armature (in the analogous consideration of the polarized relays) has just integrated the limit quantity of movement, necessary for its moving over.

While I have illustrated and described what I regard to be the preferred embodiment of my invention, nevertheless it will be understood that such is merely exemplary and that numerous modifications and rearrangements may be made therein without departing from the essence of the invention, I claim:

1. In telegraph receiving apparatus for receiving code combination signals composed of marking elements and spacing elements, the combination of a receiving relay comprising a marking element thermionic tube, a spacing element thermionic tube, a third thermionic tube, each of said tubes comprising an anode, grid and cathode, a marking element input terminal operatively connected with the grid of said marking element tube and adapted to transmit positive trigger pulses to said grid corresponding to the marking elements of said code combination signals, a grid capacitor interposed between said terminals and grid, a spacing element input terminal operatively connected with the grid of said spacing element tube and adapted to transmit positive trigger pulses to said latter grid corresponding to the spacing elements of said code combination signals, a grid capacitor interposed between said latter terminal and grid, a third input terminal operatively connected with the grid of said third tube for the application of the positive impulse necessary for making said third tube conductive, a grid capacitor interposed between said latter terminal and grid, anode circuits for each of said tubes for supplying anode potential thereto, grid control connections leading from the anodes of each of said three tubes to the grids of the other two tubes, inter-anode capacitors connected between the anodes of said marking element tube and said third tube, and between the anodes of said spacing element tube and said third tube, and resistors interposed in said anode circuits beyond said grid connections and inter-anode capacitors, said receiving relay having at least two positions of equilibrium adapted to be triggered from one equilibrium position to another in response to trigger pulses transmitted to said tubes, said inter-anode capacitors controlling the transition time from one equilibrium position to another.

2. In telegraph receiving apparatus for receiving code combination signals composed of marking elements and spacing elements, the combination of a receiving relay comprising a marking element thermionic tube, a spacing element thermionic tube, a third thermionic tube, each of said tubes comprising an anode, grid and cathode, a marking element input terminal operatively connected with the grid of said marking element tube and adapted to transmit positive pulses to said grid corresponding to the marking elements of said code combination signals, a spacing element input terminal operatively connected with the grid of said spacing element tube and adapted to transmit positive pulses to said latter grid corresponding to the spacing elements of said code combination signals, a third input terminal operatively connected with the grid of said third tube for the application of the positive impulse necessary for making said third tube conductive, anode circuits for each of said tubes for supplying anode potential thereto, grid connections leading from the anodes of each of said three tubes to the grids of the other two tubes, and inter-anode capacitors connected between the anodes of said marking element tube and said third tube and between the anodes of said spacing element tube and said third tube, said receiving relay having at least two positions of equilibrium adapted to be triggered from one equilibrium position to another in response to trigger pulses transmitted to said tubes, said inter-anode capacitors controlling the transition time from one equilibrium position to another.

3. In telegraph receiving apparatus for receiving code combination signals composed of marking elements and spacing elements, the combination of a receiving relay comprising a marking element thermionic tube, a spacing element thermionic tube, a third thermionic tube, each of said tubes comprising an anode, grid and cathode, a marking element input terminal operatively connected with the grid of said marking element tube and adapted to transmit trigger pulses to said grid corresponding to the marking elements of said code combination signals, a spacing element input terminal operatively connected with the grid of said spacing element tube and adapted to transmit trigger pulses to said latter grid corresponding to the spacing elements of said code combination signals, a third input terminal operatively connected with the grid of said third tube for the application of the proper potential for making said third tube conductive, anode circuits for each of said tubes for supplying anode potential thereto, grid connections leading from the anodes of each of said three tubes to the grids of the other two tubes, and inter-anode capacitors connected between the anodes of said marking element tube and said third tube and between the anodes of said spacing element tube and said third tube.

4. In telegraph receiving apparatus for receiving code combination signals composed of marking elements and spacing elements, the combination of a receiving relay comprising a marking element thermionic tube and a spacing element thermionic tube connected in a trigger circuit arrangement having at least two positions of equilibrium, each of said tubes comprising an anode, grid and cathode, a marking element input terminal operatively connected with the grid of said marking element tube and adapted to transmit negative trigger pulses to said grid corresponding to the marking elements of said code combination signals, a grid capacitor interposed between said terminal and grid, a spacing element input terminal operatively connected with the grid of said spacing element tube and adapted to transmit negative trigger pulses to said grid corresponding to the spacing elements of said code combination signals, a grid capacitor interposed between said latter terminal and grid, anode circuits for each of said tubes for supplying anode potential thereto, grid control connections including a resistor member connected from the anodes of each of said tubes to the grid of the other tube, an inter-anode capacitor connected between the anodes of said tube, and resistors interposed in said anode circuits beyond said grid connections and inter-anode capacitors, said resistor members in said grid control connections being arranged to provide, said receiving relay with at least two positions of equilibrium and to adapt said relay to be triggered from one equilibrium position to another in response to trigger pulses transmitted to said tubes, said inter-anode capacitor controlling the transition time from one equilibrium position to another.

5. In telegraph receiving apparatus for receiving code combination signals composed of marking elements and spacing elements, the combination of a receiving relay comprising a marking element thermionic tube and a spacing element thermionic tube connected in a trigger circuit arrangement having at least two positions of equilibrium, said tube comprising an anode, grid and cathode, a marking element input terminal operatively connected with the grid of said marking element tube and adapted to transmit negative pulses to said grid corresponding to the marking elements of said code combination signals, a spacing element input terminal operatively connected with the grid of said spacing element tube and adapted to transmit negative pulses to said grid corresponding to the spacing elements of said code combination signals, anode circuits for each of said tubes for supplying anode potential thereto, grid connections including a resistor member leading from the anodes of each of said tubes to the grid of the other tube to render said relay stable in said positions, and an inter-anode capacitor connected between the anodes of said tubes.

6. In telegraph receiving apparatus for receiving code combination signals composed of marking elements and spacing elements; the combination of a receiving relay comprising a first thermionic tube and a second thermionic tube connected in a trigger circuit arrangement having at least two positions of equilibrium, each of said tubes comprising an anode, grid and cathode, a first input terminal operatively connected with the grid of said first tube and adapted to transmit trigger pulses to said grid in response to certain elements of said code combination signals, a second input terminal operatively connected with the grid of said second tube and adapted to transmit trigger pulses to said grid in response to other elements of said code combination signals, anode circuits for each of said tubes for supplying anode potential thereto, grid connections including a resistor member leading from the anodes of each of said tubes to the grid of the other tube to render said relay stable in said positions, and an inter-anode capacitor connected between the anodes of said tubes.

7. An electronic receiving relay for use in telegraphy apparatus comprising, in combination, at least a first and second multi-electrode vacuum tube structure having anode and grid electrodes interconnected to provide a trigger circuit having a first stable condition in which said first tube is normally non-conductive and said second tube is normally conductive, and a second stable condition in which the state of conductivity of the tubes is reversed; a first input circuit connected to an electrode of said first tube for supplying an impulse which renders the first tube member non-conductive to thereby place the trigger circuit in the first one of said conditions; an input circuit for said second electrode tube for supplying an impulse thereto for rendering said second tube member conductive to thereby place the circuit in the second one of said conditions, indicating means controlled by the anode circuits of both of said tubes operative between two given conditions by said tube members to indicate the condition of the trigger circuit, said indicating means being controlled to operate to its first indicating condition with receipt of an impulse over said first circuit to operate said trigger circuit to said first condition and being controlled to operate to its second indicating condition with receipt of an impulse over said second circuit to operate said trigger circuit to said second condition; and transition control means including time delay means connected in said trigger circuit operative to effect transition from one of said indicating conditions to the other of said indicating conditions only with sustained receipt of an impulse for a predetermined period of its assigned duration as determined by the value of said time delay means.

8. A relay as set forth in claim 7 in which said indicating member includes a capacitor connected between the anode circuit of said first and second tube members and in which said capacitor is positively charged to indicate operation of said trigger circuit to said first condition and said capacitor is negatively charged to indicate operation of said trigger circuit to said second condition.

9. An electronic receiving relay for use in telegraph apparatus adapted to receive impulses of a given duration representing mark and space elements of a communication code, comprising a first and second multi-electrode vacuum tube structure having anode and grid electrodes interconnected to provide a trigger circuit having a first stable condition in which said first tube is normally non-conductive and said second tube is normally conductive, and a second stable condition in which the state of conductivity of the tubes is reversed; a first input circuit connected to an electrode of said first tube for supplying an impulse of a duration equivalent to each mark element received which renders the first tube member non-conductive to thereby place the trigger circuit in the first one of said conditions; an input circuit for said second electrode for supplying an impulse of a duration equivalent to each incoming space element to render said second tube member non-conductive and to thereby place said triggering circuit in the second one of said conditions; indicating means controlled by the anode circuit of both of said tubes operative between two given conditions by said tube members, said indicating member being controlled to operate to its first indicating condition to indicate receipt of a marking element and being controlled to operate to its second indicating condition to indicate receipt of a space element; and transition control means associated with said indicating means operative to effect transition from one of the indicating conditions to the other indicating condition only responsive to sustained receipt of an impulse for a substantial predetermined period of said given impulse duration.

10. An arrangement as set forth in claim 9 in which said transition control means effect transition in response to intermittent pulses having a total value equivalent to the sum of said predetermined period plus one-half the difference between said given impulse duration and said predetermined period.

11. An arrangement as set forth in claim 9 in which said predetermined period is one-half said given impulse duration and said transition control means respond to an intermittent pulse only if said pulse has a total duration of more than 75% of said given impulse duration.

12. An electronic receiving relay for use in telegraphy apparatus adapted to receive impulses of a given duration representing mark and space elements of a communication code, comprising in combination, a first, a second and a third multi-electrode vacuum tube structure having anode and grid electrodes interconnected to provide a trigger circuit in which said third tube is normally conductive and said first and second tube members are normally non-conductive; said trigger circuit having a first stable condition in which said first tube is normally conductive and said second tube and said third tube are normally non-conductive, and a second stable condition in said second tube is conductive and said first and third tubes are non-conductive; a first input circuit connected to an electrode of said first tube for supplying an impulse of a duration equivalent to each mark element received for rendering said first tube member conductive to thus place the trigger circuit in said first stable condition; an input circuit for said second electrode tube for supplying an impulse thereto of a duration equivalent to each space element received for rendering said second tube member conductive to thus place the circuit in the second one of said conditions; and indicating means connected in the anode circuits of said tubes operated to indicate receipt of a marking element with placement of said equipment in said first condition and operated to indicate receipt of a space element with placement of said equipment in said second condition; and transition control means including said third tube for preventing transition from one indicating condition to another prior to rendering of the previously effective tube non-conductive and the rendering of said third tube conductive.

13. An arrangement as set forth in claim 12 in which said transition control means includes time delay means connected to control said electronic tube circuits to effect transition from one indicating condition to another only in response to the continued receipt of an effective impulse for a predetermined period of the given impulse duration and to the receipt of intermittent pulses having a sum total value equal to said predetermined period plus one-half the difference between said given impulse duration and said predetermined period.

HENDRIK C. A. van DUUREN.

REFERENCES CITED

The following references are of record in the file of this patent:

UNITED STATES PATENTS

| Number | Name | Date |
|---|---|---|
| 2,154,492 | Clough | Apr. 18, 1939 |
| 2,227,493 | Finch | Jan. 7, 1941 |
| 2,430,725 | Miller et al. | Nov. 11, 1947 |
| 2,441,963 | Gray | May 25, 1948 |

FOREIGN PATENTS

| Number | Country | Date |
|---|---|---|
| 882,314 | France | Feb. 22, 1943 |

OTHER REFERENCES

Journal of Scientific Instruments, vol. 15, 1938, "A Thyratron Counter . . . Chronograph" by Uffelmann, pages 222–226.